Sept. 26, 1950  F. W. FRINK  2,523,288
DIRECTION FINDER SYSTEM
Filed Aug. 9, 1944  4 Sheets-Sheet 3

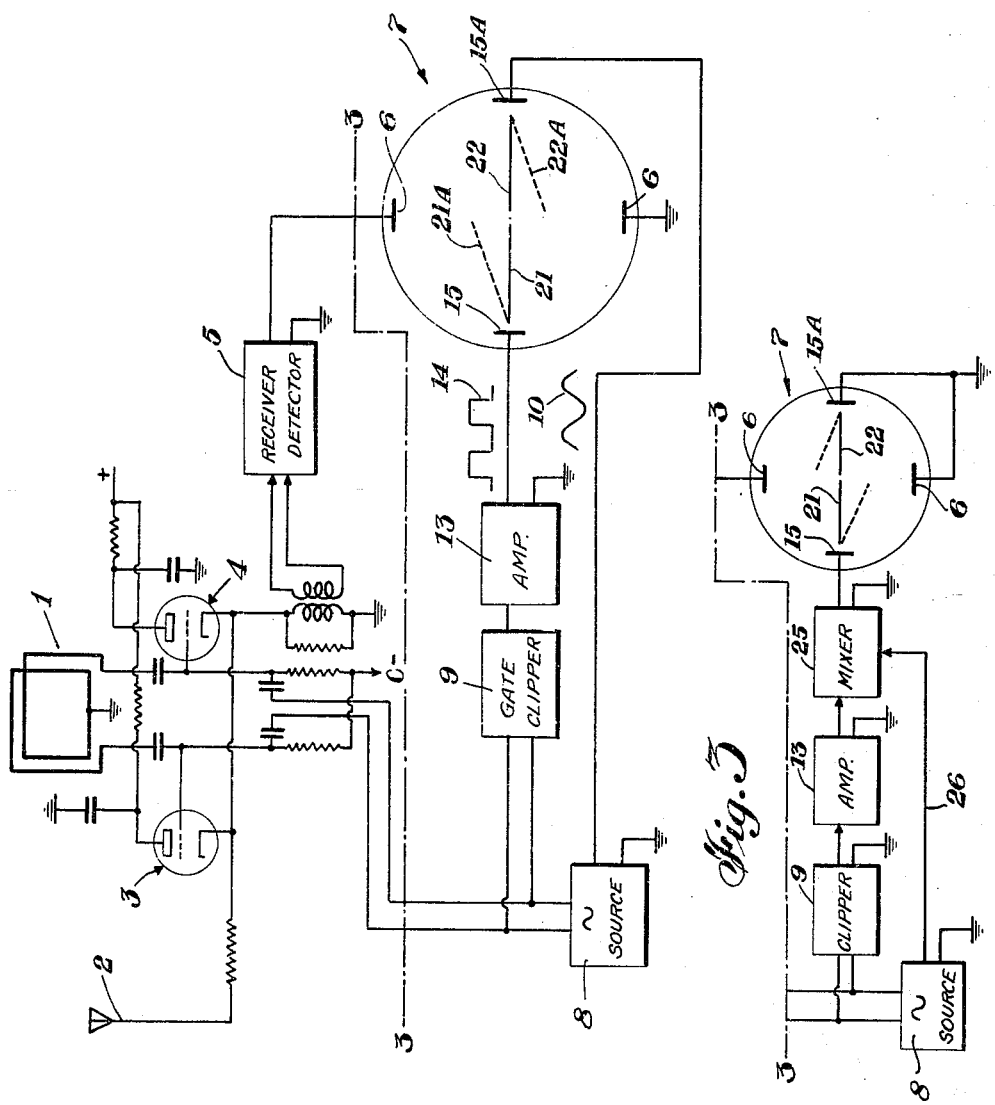

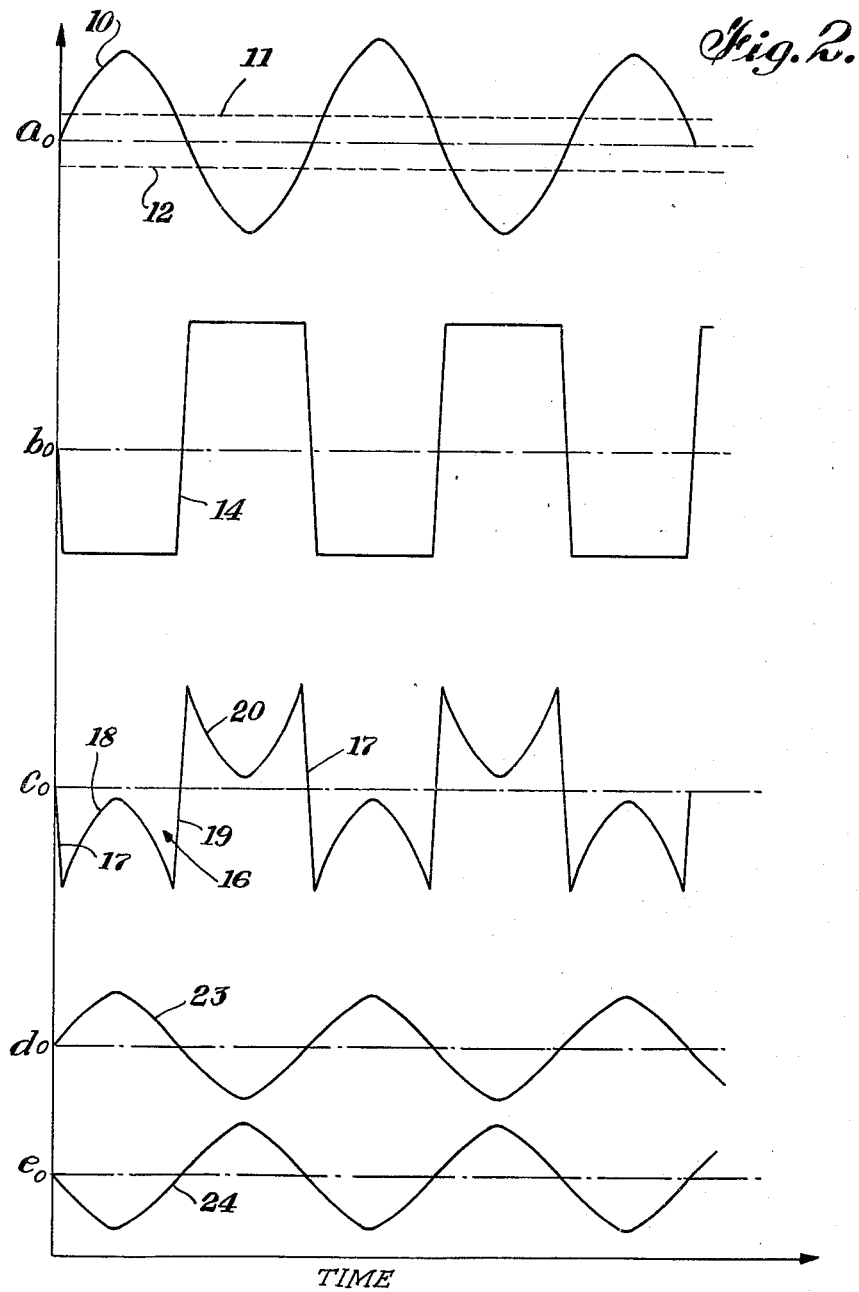

INVENTOR.
FREDERICK W. FRINK
BY
*R. P. Morris*
ATTORNEY

Sept. 26, 1950  F. W. FRINK  2,523,288
DIRECTION FINDER SYSTEM
Filed Aug. 9, 1944  4 Sheets-Sheet 4

INVENTOR.
FREDERICK W. FRINK
BY
ATTORNEY

Patented Sept. 26, 1950

2,523,288

UNITED STATES PATENT OFFICE 2,523,288

DIRECTION FINDER SYSTEM

Frederick W. Frink, East Orange, N. J., assignor to Federal Telephone and Radio Corporation, New York, N. Y., a corporation of Delaware Application August 9, 1944, Serial No. 548,700

4 Claims. (Cl. 343—121)

This invention relates to direction finder systems and more particularly to direction finder systems of the so-called homing type used on aircraft and ships.

In direction finder systems of the homing type, there is generally provided on a craft a fixed directive antenna and a sensing antenna which is alternately switched to be effective with opposite sides of the loop to provide overlapping radiant acting patterns of different form in response to energy emitted from a given transmitter. The signal energy from the antenna is applied to a receiving circuit producing separate output amplitudes depending upon the heading of the craft and the alternate connection of the sensing antenna. Means is provided for comparing the amplitude of the signals received on the two directive patterns produced by the alternate switching for the purpose of determining the alignment of the receiver antenna, and the corresponding heading of the craft with respect to the source of radio emission. In such systems, arrangements have been proposed wherein the directive indications may be produced on a cathode ray oscillograph or the like.

It is an object of my invention to provide a novel indicator and indicating method for producing comparison indications of two signals of difference amplitude.

It is a further object of my invention to provide an indicator wherein an aligned trace is provided on the face of the indicator, the halves of this trace being displaced from alignment in response to departure from alignment course of a direction finder antenna.

It is a further object of my invention to provide a cathode ray indicator, particularly for direction finders, wherein signalling energies of alternately opposite polarity are applied to one pair of deflecting electrodes of the indicator and sweep voltages, alternately varying between positive and negative maxima and substantially zero amplitude, are applied alternately to the other deflecting electrodes.

It is a still further object of my invention to provide a direction finder indicator wherein tracings on a cathode ray screen are substantially aligned when the direction finder antenna is directed toward a given signal source and in which these tracings are displaced relative to one another out of alignment upon departure of the antenna from alignment with said signal source.

According to a feature of my invention, I provide a directional antenna which may be mounted on a craft together with a sensing antenna alternately made effective in different phase relationships. The modulated energy resulting from this alternate operation is detected producing alternate waves forming a zero resultant output when the craft is headed toward the transmitting station and producing resultant output waves of different phase position depending upon the direction of departure of the receiver from a heading toward the transmitting station. This output voltage is applied across one pair of electrodes of a cathode ray indicator tending to produce vertical deflection. Across the other pair of electrodes is applied a scanning voltage producing a deflection of the cathode ray beam alternately between zero and oppositely positioned deflecting electrodes. Accordingly, when the craft is headed so that the receiver antenna is aligned with the transmitting station, a trace is produced on the screen of the cathode ray tube, the two halves of this trace being substantially aligned one with another. However, upon departure from this heading the trace halves will be varied in their position of alignment alternatively in accordance with the direction of departure from course of the heading of the craft and by amounts depending upon the degree of such departure.

A better understanding of my invention and the objects and features thereof may be had from the accompanying description of particular embodiments thereof made with reference to the accompanying drawings, in which:

Fig. 1 is a schematic wiring diagram partly in block circuit illustrating a direction finder in accordance with my invention;

Fig. 2 is a graphical representation of operating voltages used in explaining the operation of the system of Fig. 1;

Figure 4:
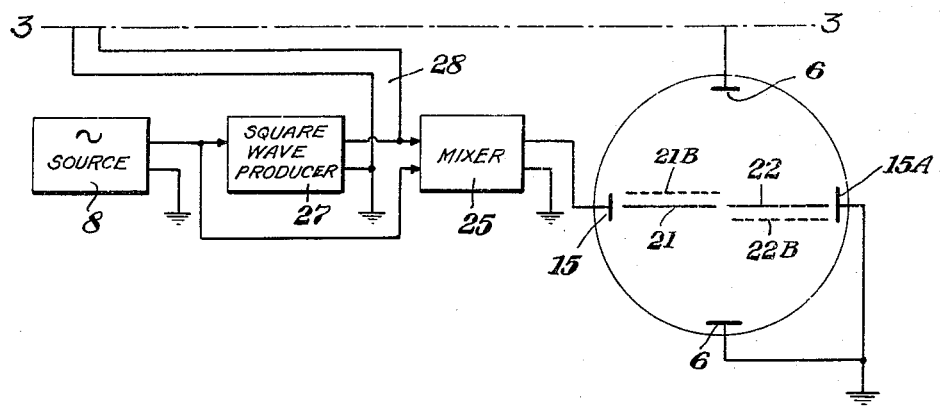
Figure 5:
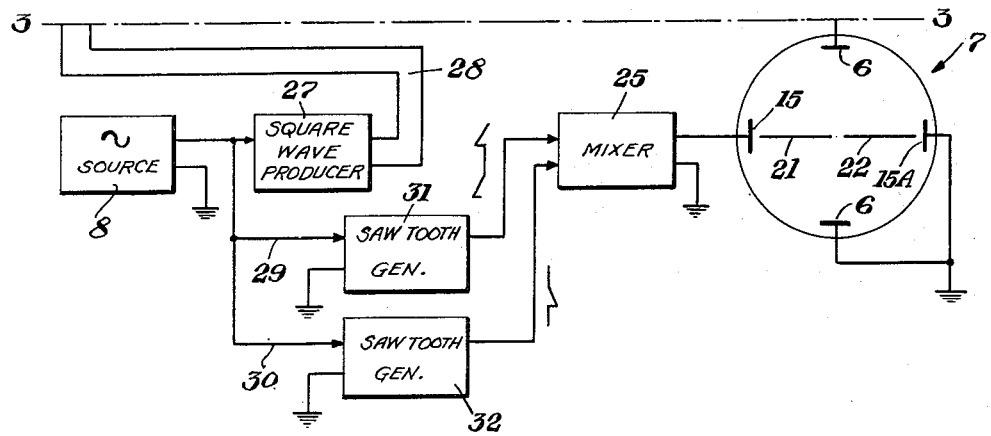
Figure 7:
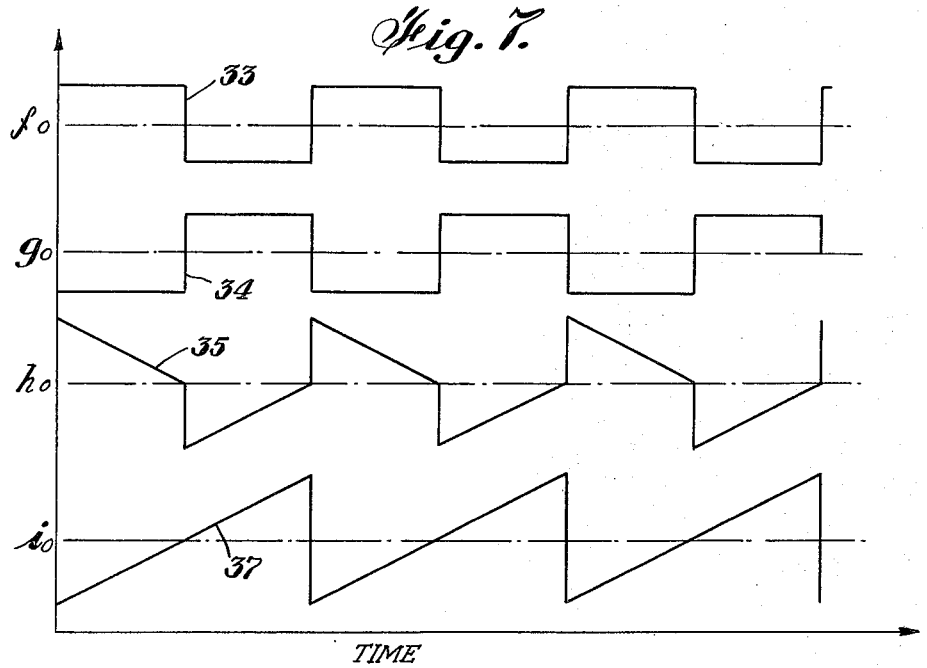
Figure 6:
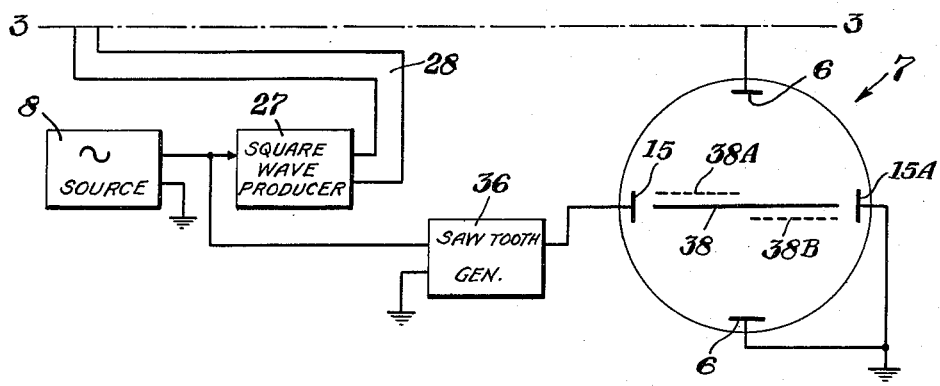

Figs. 3 to 6 inclusive, are schematic wiring diagrams of alternative constructions of indicator apparatus which may replace that portion below line 3 of Fig. 1; and Fig. 7 is a graphical representation of operating voltages used in explaining the operation of the system of Figs. 5 and 6.

Turning first to Fig. 1, the direction finder system may comprise a directional antenna 1 shown as a loop, provided with a sensing antenna 2. A pair of switching tubes 3 and 4 are connected for coupling loop antenna 1 with receiver detector 5 in alternately reversed phase relationship. Sensing antenna 2 is coupled permanently to receiver detector 5 to furnish sensing energy for the patterns produced by the alternate switching. The output of receiver 5 is coupled across electrodes 6 of a cathode ray indicator 7. An alternating current source 8 is coupled to the grids of tubes 3 and 4 rendering these tubes alternately effective to pass energy from opposite sides of loop antenna 1 to the receiver. As a consequence, energy from loop antenna 1 is alternately added in different phase to energy from antenna 2 so the energy applied to the receiver is in the form of overlapping cardioid patterns. When antenna 1 is aligned with its plane perpendicular to the direction or course line between the receiver and the transmitting station, two cardioid patterns present equal energies of opposite phase to receiver detector 5 so that the resultant output is substantially zero. However, upon departure in one direction from the course line, the antenna will produce a pattern stronger in one direction than the other so that there will be a resultant output from receiver detector 5. Upon departure in the opposite direction, a resultant output of opposite phase will be produced in receiver detector 5. These output waves are in the form of sinusoids of the same frequency as source 8 since source 8 produces this modulating action.

Energy from source 8 may be shaped into square or rectangular wave energy by passing through a gate clipper 9 clipping the control wave 10 from source 8, see curve a, Fig. 2, at clipping levels 11 and 12. This clipped wave may be amplified in amplifier 13 producing the resultant substantially square wave 14, curve b of Fig. 2. This square wave may be applied to deflecting electrode 15 of cathode ray indicator 7. Simultaneously, wave 10 from source 8 is applied in opposite phase relationship to deflecting electrode 15A of cathode ray indicator 7 producing between electrodes 15 and 15A a resultant composite deflecting potential wave 16 indicated at curve c, Fig. 2. Referring to curve c, it is clear that the first vertical portion 17 of wave 16 will rapidly deflect the beam from the zero center position to the left hand position of the cathode ray screen. The beam will then follow a deflection path toward the center of the screen and return again to the left hand side under influence of voltage 18 of wave 16. Immediately therefore under the influence of voltage 19 of wave 16 the beam will flip across to the right hand side of the indicator screen. The beam will then trace a line from the right hand side of the screen toward the center and return again to the right hand side under influence of voltage 20 of wave 16 whereafter the original cycle will again be repeated. It will thus be seen that a trace composed of two lines 21 and 22 will be produced on the screen of cathode ray indicator 7 under the influence of the sweep potential. When the receiving antenna 1 is aligned with the direction of reception, these lines 21 and 22 will be aligned on the screen. Preferably, wave 10 is of such an amplitude with respect to wave 14 that portions 18 and 20 of resultant wave 16 will approach but will not quite reach zero. Thus, there will appear a gap between tracing lines 21 and 22. It is clear, however, that if desired the sweep potential may be such that the lines will both sweep past zero.

When the antenna is not aligned with the course, there will be a resultant output from receiver detector 5. Assuming the antenna is displaced from the course line so that an output wave occurs in the form of curve 23, Fig. 2, then this voltage will be applied across electrodes 6. Since the first half cycle of curve 23 is positive, this will cause a deflection of line 21 upwardly into the position shown at 21A. The second half of the first period of wave 23 is negative producing a downward deflection of line 22 into position 22A. Thus a departure from course in this direction will produce this form of deflection which may be easily read. Should the antenna depart from a course in the opposite direction, a curve such as shown at 24, curve e of Fig. 2, will be produced. This wave is of opposite phase to voltage wave 23 and will therefore cause lines 21 and 22 to be deflected downwardly and upwardly, respectively. The amount of departure of lines 21 and 22 from their normal aligned position will depend upon the amplitude of resultant waves 23 and 24. Thus the indicator produces an indication of the direction and degree of departure from course.

While in connection with Fig. 1 I have shown the square wave and the sine wave separately applied to deflecting electrodes 15 and 15A of indicator 7 to effectively produce the combined wave 16, it is clear that these waves may be combined before application. In Fig. 3 is shown a schematic block diagram circuit of such a system. In this arrangement the output waves from source 8 are shaped into suitable square waves by means of clipper 9 and amplifier 13 in the same manner as defined in connection with Fig. 1. However, these output waves are applied to a mixer circuit 25. Simultaneously, waves such as 10 of Fig. 2 are applied over line 26 to mixer 25 producing therein a resultant wave such as 16 of Fig. 2. This resultant voltage wave is then applied between electrodes 15 and 15A of indicator 7 to produce trace lines 21 and 22. At the same time the output from receiver detector 5 may be applied across vertical deflecting electrodes 6. Mixer 25 may be of any desired form. Various types of voltage mixers for adding waves are known to the prior art.

While in Figs. 1 and 3, a circuit arrangement is shown providing a sine wave for switching antenna 1 to produce a resultant sine wave modulation in the output, it is clear that other forms of switching waves may be used if desired. In Fig. 4 is shown a switching arrangement which may be coupled with the receiver portion of Fig. 1 utilizing a square wave voltage for the switching operation. According to this arrangement energy from source 8 is applied to square wave producer 27 which may comprise a clipper amplifier arrangement such as shown in Figs. 1 and 3 or any other form of square wave producer, producing waves properly timed with those of source 8. The output of this square wave producer together with a sine output from source 8 is applied to mixer 25 and from there to electrodes 15 and 15A of indicator 7. A second output line 28 from the output of square wave producer 27 is provided for connection to the grids of tubes 3 and 4 of Fig. 1, for example, to provide a square wave switching voltage. This wave may be substantially in the same form as shown at 14 of Fig. 2. The output from receiver detector 5 of Fig. 1 applied across electrodes 6 will thus be in square wave form such as shown in 14 but will differ in phase depending upon the departure from course in the same manner as waves 23 and 24. Thus, trace lines 21, 22 will be displaced vertically into positions 21B, 22B upon departure from course of antenna 1 instead of being swung as shown at 21A, 22A of Fig. 1. Similarly, upon departure from course in the other direction, trace lines 21, 22 will be displaced oppositely from the showing of Fig. 4. It will thus be clear that with the square wave modulating switching potential, departure from course may likewise be determined by the displacement from alignment of traces 21 and 22.

It will be clearly understood in all of the showings made herein that the horizontal deflection of the cathode ray beam caused by the substantially vertical portions 17 and 19 of the deflecting potential will produce such faint traces on the cathode ray screen that they will be substantially not visible. However, if it is desired to remove these extra tracings entirely from the screen, any known form of blanking signal may be used. Furthermore, it should be clearly understood that in connection with Fig. 4 the square waves and the sine waves may be separately applied to the indicator in the manner shown in Fig. 1, if desired, instead of being mixed first.

In all the circuits so far described in connection with Figs. 1 to 4, I have shown a deflection voltage produced from the combination of a sine wave and a square wave. This type of voltage is particularly advantageous since it is easy to obtain. Furthermore, when a sine wave switching voltage is used, as in the case of the circuits of Figs. 1 and 3, it will produce the desired linear swing of the parts of the cathode ray trace. It is clear, however, that the principles of my invention may be readily applied to circuits utilizing other types of sweep wave voltages. In Fig. 5 is shown a modification wherein a combination sawtooth type deflection voltage is used. According to this arrangement, energy from the common source 8 serves to energize the square wave producer 27 which furnishes the switching signal to the antenna over line 28. This same common source 8 supplies other energy over lines 29 and 30 to separate sawtooth generators 31 and 32, the outputs of which are combined in a mixer 25.

Turning to Fig. 7, the operation of this type of circuit may be more readily understood. In this figure, curves $f$ and $g$ represent output waves from the receiver shown at 33 and 34, respectively, depending upon the direction of departure from course line of the receiving antenna. These output voltages are applied to the vertical deflecting electrodes 6 of indicator 7. The two decaying sawtooth waves from sawtooth generators 31 and 32 combine to form composite wave 35, curve $h$, which is applied to the horizontal sweep voltage electrodes 15, 15A. This wave form may be generated in any known manner and not necessarily as shown herein. It can be seen that with this type of sweep circuit the cathode ray beam will be swept first from 15 to the center where it will be rapidly deflected to the other side 15A and will then be deflected slowly from 15A to the center or zero position. Thus, on the cathode ray screen will be produced a trace having two parts 21 and 22 corresponding to similar trace lines in the earlier described figures. Upon departure, of course, these two trace lines will be displaced from alignment in the same manner as described more particularly in connection with Fig. 4.

In Fig. 6 is shown still another modification in which energy from a source 8 again supplies square waves from square wave producer 27 over line 28 for the purpose of switching the antenna circuit. At the same time, energy from source 8 is supplied to synchronize the sawtooth generator 36 which produces a sawtooth wave 37, Fig. 7, curve $i$. This sawtooth voltage has a period equal to a period of waves 33 and 34 and is applied across electrodes 15 and 15A normally producing a trace 38 across the face of the screen. When the craft is on course, two parts 38A and 38B of trace 38 will be in alignment. However, in departure from course two halves of the wave will be displaced one from another in the same manner as the two separate trace line parts of Figs. 4 and 5 were displaced. This circuit has considerable advantage over that shown in Fig. 5 since it is much simpler to produce the simple sawtooth wave 37 than the more complex wave 35. It should be further understood that in both the illustrations shown in Figs. 5 and 6, common source 8 is used merely as a proper synchronizing or timing voltage source. The timing of the waves may take place from the square wave producer itself, if desired, or from any one of the sawtooth generators as used.

Many further similar modifications of a direction finder indicator in accordance with the principles outlined above will readily occur to those skilled in the art.

It should be distinctly understood that the specific description and illustrations made herein are made merely by way of example and not as a limitation on the scope of my invention.

I claim:

1. In a direction finder in combination, means for receiving signal energy according to two opposed directional reception patterns, means for generating a synchronizing sine voltage wave, a receiver, switching means responsive to said sine wave for alternately switching to said receiver the signal energy received according to each of said directive patterns, means to derive at the output of said receiver a voltage wave with an amplitude proportional to the amplitude relation of said signal energies, said output voltage wave having a cophasal or antiphasal relationship to said synchronizing sine wave dependent upon the reception pattern according to which the signal energy having the greatest amplitude is received, a cathode ray indicator means having two pairs of deflecting electrodes, means to apply said output voltage wave to one pair of said electrodes, means to derive a square voltage wave from said synchronizing sine voltage wave of opposite phase and with substantially the same amplitude as said synchronizing sine voltage wave, means to combine said synchronizing sine voltage wave with said square voltage wave, means to apply the resultant combined wave to the other pair of electrodes in said cathode ray indicator to produce two lines, each line having an angular displacement indicative of the orientation of the directional reception patterns with respect to the direction from which the signal energy is received.

2. In a direction finder in combination, means for receiving signal energy according to two opposed directional reception patterns, means for generating a synchronizing sine voltage wave, means for deriving a synchronizing square voltage wave from said sine wave, a receiver, switching means responsive to said square voltage wave for alternately switching to said receiver the signal energy received according to each of said directive patterns, means to derive at the output of said receiver a voltage wave with an amplitude proportional to the amplitude relation of said signal energies, said output voltage wave having a cophasal or antiphasal relationship to said sine wave dependent upon the reception pattern according to which the signal energy having the greatest amplitude is received, a cathode ray indicator means having two pairs of deflecting electrodes, means to apply said output voltage wave to one pair of said electrodes, means to invert the phase of said square voltage wave with respect to said sine voltage wave, means to combine said sine voltage wave with said square voltage wave, and means to apply the resultant combined wave to the other pair of electrodes in said cathode ray indicator to produce two lines, one on each side of the said indicator, with a displacement between them indicative of the orientation of the directional reception patterns with respect to the direction from which the signal energy is received.

3. In a direction finder in combination, means for receiving signal energy according to two opposed directional reception patterns, means for generating a synchronizing voltage wave, a receiver, switching means responsive to said synchronizing wave for alternately switching to said receiver the signal energy received according to each of said directive patterns, means to derive at the output of said receiver a voltage wave with an amplitude proportional to the amplitude relation of said signal energies, said output voltage wave having a cophasal and antiphasal relationship to said synchronizing wave dependent upon the reception pattern from which the signal energy having the greatest amplitude is received, a cathode ray indicator means having two pairs of deflecting electrodes, means to apply said output voltage wave to one pair of said electrodes, means to derive from said synchronizing voltage wave, a sweep voltage wave with each successive half cycle of opposite polarity having an initial substantially perpendicular slope, means to apply said sweep voltage wave to the other pair of said electrodes in the cathode ray indicator to trace on the screen of said indicator two lines with a maximum displacement between the adjacent ends thereof in the center area of said screen indicative of the orientation of the directional reception patterns with respect to the direction from which the signal energy is received.

4. In a direction finder in combination, means for receiving signal energy according to two opposed directional reception patterns, means for generating a synchronizing sine voltage wave, means to derive a synchronizing square wave voltage from said sine wave, a receiver, switching means responsive to said square voltage wave for alternately switching to said receiver the signal energy received according to each of said directive patterns, means to derive at the output of said receiver a sine wave voltage with an amplitude proportional to the amplitude relation of said signal energies, said output voltage wave having a cophasal or antiphasal relationship to said generated sine wave dependent upon the reception pattern from which the signal energy having the greatest amplitude is received, a cathode ray indicator means having two pairs of deflecting electrodes, means to apply said output voltage wave to one pair of said electrodes, means to derive from said sine wave a sawtooth wave with each half circle of opposite polarity having one short and substantially vertical slope and one long and substantially horizontal slope, means to apply the said sawtooth wave to the other pair of electrodes in said cathode ray indicator to produce two lines with a displacement between them indicative of the orientation of the directional reception patterns with respect to the direction from which the signal energy is received.

FREDERICK W. FRINK.

REFERENCES CITED

The following references are of record in the file of this patent:

UNITED STATES PATENTS

| Number | Name | Date |
| --- | --- | --- |
| 2,143,178 | Wright | Jan. 10, 1939 |
| 2,172,395 | McSpadden | Sept. 12, 1939 |
| 2,252,063 | Cockerell | Aug. 12, 1941 |
| 2,263,377 | Busingnies et al. | Nov. 18, 1941 |
| 2,300,189 | Wolff | Oct. 27, 1942 |
| 2,312,203 | Wallace | Feb. 23, 1943 |
| 2,368,448 | Cook | Jan. 30, 1945 |
| 2,401,404 | Bedford | June 4, 1946 |
| 2,403,540 | Meneley | July 9, 1946 |
| 2,421,312 | Bobb | May 27, 1947 |

FOREIGN PATENTS

| Number | Country | Date |
| --- | --- | --- |
| 496,001 | Great Britain | Nov. 23, 1938 |
| 503,471 | Great Britain | Apr. 6, 1939 |
| 844,434 | France | Apr. 24, 1939 |